United States Patent
Loose

(10) Patent No.: US 7,171,315 B2
(45) Date of Patent: Jan. 30, 2007

(54) METHOD AND APPARATUS FOR MEASURING A PARAMETER OF A FLUID FLOWING WITHIN A PIPE USING SUB-ARRAY PROCESSING

(75) Inventor: Douglas H. Loose, Southington, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/997,632

(22) Filed: Nov. 24, 2004

(65) Prior Publication Data

US 2005/0125169 A1 Jun. 9, 2005

Related U.S. Application Data

(60) Provisional application No. 60/524,744, filed on Nov. 25, 2003.

(51) Int. Cl.
*G01F 1/00* (2006.01)
*G01F 7/00* (2006.01)
*G06F 19/00* (2006.01)

(52) U.S. Cl. ............................ 702/45; 702/98; 702/196

(58) Field of Classification Search .................. 702/45, 702/47, 50, 54, 56, 98, 100, 103, 104, 138, 702/146, 189, 196, 199; 73/61.47, 61.49, 73/61.79, 597, 643, 645, 655–657
See application file for complete search history.

(56) References Cited

U.S. PATENT DOCUMENTS

| | | | |
|---|---|---|---|
| 4,048,853 A | 9/1977 | Smith et al. ............... | 73/861.25 |
| 4,080,837 A | 3/1978 | Alexander et al. ........ | 73/61.45 |
| 4,195,517 A | 4/1980 | Kalinoski et al. ........ | 73/461.27 |
| 4,445,389 A | 5/1984 | Potzick et al. ........... | 73/861.27 |
| 4,896,540 A | 1/1990 | Shakkottai et al. ....... | 73/861.02 |
| 5,040,415 A | 8/1991 | Barkhoudarian .......... | 73/861.03 |
| 5,083,452 A | 1/1992 | Hope ....................... | 73/61 R |
| 5,285,675 A | 2/1994 | Colgate et al. ........... | 73/23.2 |
| 5,367,911 A | 11/1994 | Jewell et al. ............. | 73/861.08 |
| 5,398,542 A | 3/1995 | Vasbinder ................. | 73/40.5 |
| 5,524,475 A | 6/1996 | Kolpak et al. ............ | 73/19.03 |
| 5,526,844 A | 6/1996 | Kamen et al. ............ | 137/614.11 |

(Continued)

FOREIGN PATENT DOCUMENTS

WO  WO 93/14382  7/1993

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Bryan Bui

(57) ABSTRACT

A parameter of a fluid passing through a pipe is measured using a spatial array of sensors disposed at different axial locations along the pipe. The spatial array includes at least two overlapping sub-arrays. Using the pressure signals, a signal processor determines a spatial correlation matrix for each of the sub arrays. The spatial correlation matrices from the sub-arrays are averaged, and the averaged spatial correlation matrix is used as input to an adaptive array processing algorithm. The pipe may be open ended such that it can be positioned within the fluid flow for forming a portion of a sensing device.

20 Claims, 12 Drawing Sheets

U.S. PATENT DOCUMENTS

| | | | |
|---|---|---|---|
| 5,591,922 A | 1/1997 | Segeral et al. | 73/861.04 |
| 5,741,980 A | 4/1998 | Hill et al. | 73/861.04 |
| 5,770,806 A | 6/1998 | Hiismaki | 73/861.29 |
| 5,835,884 A | 11/1998 | Brown | 73/861.04 |
| 5,856,622 A | 1/1999 | Yamamoto et al. | 73/861.28 |
| 5,948,959 A | 9/1999 | Peloquin | 73/1.83 |
| 6,151,958 A | 11/2000 | Letton et al. | 73/61.79 |
| 6,202,494 B1 | 3/2001 | Riebel et al. | 73/861.29 |
| 6,354,147 B1 | 3/2002 | Gysling et al. | |
| 6,378,357 B1 | 4/2002 | Han et al. | 73/54.41 |
| 6,397,683 B1 | 6/2002 | Hagenmeyer et al. | 73/861.18 |
| 6,435,030 B1 | 8/2002 | Gysling et al. | |
| 6,450,037 B1 | 9/2002 | A.R. Davis et al. | |
| 6,463,813 B1 | 10/2002 | Gysling | |
| 6,532,827 B1 | 3/2003 | Ohnishi | 73/861.27 |
| 6,587,798 B2 | 7/2003 | Gysling et al. | |
| 6,609,069 B2 | 8/2003 | Gysling | |
| 6,691,584 B2 | 2/2004 | Gysling et al. | |
| 6,732,575 B2 * | 5/2004 | Gysling et al. | 73/61.79 |
| 6,782,150 B2 | 8/2004 | Davis et al. | |
| 6,862,920 B2 * | 3/2005 | Gysling et al. | 73/61.79 |
| 6,889,562 B2 | 5/2005 | Gysling et al. | |
| 6,898,541 B2 | 5/2005 | Gysling et al. | |
| 6,945,095 B2 | 9/2005 | Johansen | 73/861.18 |
| 6,950,760 B2 | 9/2005 | Henry et al. | 702/45 |
| 7,032,432 B2 | 4/2006 | Gysling et al. | |
| 2003/0089161 A1 | 5/2003 | Gysling | |
| 2003/0136186 A1 | 7/2003 | Gysling | |
| 2003/0154036 A1 | 8/2003 | Gysling et al. | |
| 2004/0069069 A1 | 4/2004 | Croteau | |
| 2004/0074312 A1 | 4/2004 | Gysling | |
| 2004/0144182 A1 | 7/2004 | Gysling et al. | |
| 2004/0168523 A1 | 9/2004 | Bailey et al. | |
| 2004/0199341 A1 | 10/2004 | Gysling et al | |
| 2004/0210404 A1 | 10/2004 | Gysling et al. | |
| 2004/0255695 A1 | 12/2004 | Gysling et al. | |
| 2005/0039520 A1 | 2/2005 | Baily et al. | |
| 2005/0125166 A1 * | 6/2005 | Loose et al. | 702/45 |
| 2005/0171710 A1 | 8/2005 | Gysling et al. | |
| 2005/0227538 A1 | 10/2005 | Engel | |

FOREIGN PATENT DOCUMENTS

| | | |
|---|---|---|
| WO | WO 99/067629 | 12/1999 |
| WO | WO 00/060317 | 10/2000 |
| WO | WO 01/002810 | 1/2001 |

OTHER PUBLICATIONS

"Two Decades of Array Signal Processing Research", The Parametric Approach, H. Krim and M. Viberg, IEEE Signal Processing Magazine, Jul., 1996, pp. 67-94.

Sonar-Based Volumetric Flow Meter for Pulp and Paper Applications - By: Daniel L. Gysling & Douglas H. Loose - Dec. 3, 2002, 5 pages.

Sonar Based Volumetric Flow Meter for Chemical and Petrochemical Applications - By: Daniel L. Gysling & Douglas H. Loose - Feb. 14, 2003, 8 pages.

Sonar Based Volumetric Flow and Entrained Air Measurement for Pulp and Paper Applications - By: Daniel L. Gysling & Douglas H. Loose - Jan. 24, 2003 5 pages.

"New Flowmeter Principle"- By: Walt Boyes - Published in Flow Control Magazine - Oct. 2003 Issue, 1 page.

"Piezoelectric Polymers"- By: J.S. Harrison and Z. Ounaies - ICASE Report, 2001; 27 pages.

"Development of an array of pressure sensors with PVDF film, Experiments in Fluids 26", Jan. 8, 1999, Springer-Verlag, 9 pages.

"Array Signal Processing: Concepts and Techniques" pp. 186-191 by: Don H. Johnson and Dan E. Dudgeon, 1993.

* cited by examiner

… … …

METHOD AND APPARATUS FOR MEASURING A PARAMETER OF A FLUID FLOWING WITHIN A PIPE USING SUB-ARRAY PROCESSING

CROSS-REFERENCE TO RELATED PATENT APPLICATIONS

The present application claims the benefit of U.S. Provisional Patent Application No. 60/524,744, filed Nov. 25, 2003, which is incorporated by reference herein in its entirety.

TECHNICAL FIELD

This invention relates to a method and apparatus for measuring at least one parameter of a fluid flowing within a pipe. More specifically, this invention relates to a method and apparatus for measuring a parameter of a fluid flowing within a pipe using sub-array processing.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g., saturated steam and other vapor/liquid mixtures, paper and pulp slurries or other solid/liquid mixtures). The multi-phase mixture may be a two-phase liquid/gas mixture (e.g., fuel/air mixtures), a solid/gas mixture or a solid/liquid mixture, gas entrained liquid or a three-phase mixture.

Various sensing technologies exist for measuring various physical parameters of fluids in an industrial flow process. Such physical parameters may include, for example, volumetric flow rate, composition, consistency, density, and mass flow rate.

One such sensing technology is described in commonly-owned U.S. Pat. No. 6,609,069 to Gysling, entitled "Method and Apparatus for Determining the Flow Velocity Within a Pipe", which is incorporated herein by reference. The '069 patent describes a method and corresponding apparatus for measuring the flow velocity of a fluid in an elongated body (pipe) by sensing vortical disturbances convecting with the fluid. The method includes the steps of: providing an array of at least two sensors disposed at predetermined locations along the elongated body, each sensor for sampling the pressure of the fluid at the position of the sensor at a predetermined sampling rate; accumulating the sampled data from each sensor at each of a number of instants of time spanning a predetermined sampling duration; and constructing from the accumulated sampled data at least a portion of a so called k-ω plot, where the k-ω plot is indicative of a dispersion relation for the propagation of acoustic pressures emanating from the vortical disturbances. The method also includes the steps of: identifying a convective ridge in the k-ω plot; determining the orientation of the convective ridge in the k-ω plot; and determining the flow velocity based on a predetermined correlation of the flow velocity with the slope of the convective ridge of the k-ω plot.

Another such sensing technology is described in commonly-owned U.S. Pat. Nos. 6,354,167 and 6,732,575 to Gysling et. al, both of which are incorporated by reference herein in their entirety. The '167 and '575 patents describe a spatial array of acoustic pressure sensors placed at predetermined axial locations along a pipe. The pressure sensors provide acoustic pressure signals to signal processing logic which determines the speed of sound of the fluid (or mixture) in the pipe using any of a number of acoustic spatial array signal processing techniques with the direction of propagation of the acoustic signals along the longitudinal axis of the pipe. The speed of sound is provided to logic, which calculates the percent composition of the mixture, e.g., water fraction, or any other parameter of the mixture, or fluid, that is related to the sound speed. The logic may also determine the Mach number of the fluid.

Such sensing technologies are effective in determining various parameters of a fluid flow within a pipe. However, as with any computationally complex process, there remains a desire to increase computational efficiency and accuracy.

SUMMARY OF THE INVENTION

The above-described and other needs are met by an apparatus, method, and storage medium of the present invention, wherein a parameter of a fluid passing through a pipe is measured using a spatial array of at least three sensors disposed at different axial locations along the pipe. Each of the sensors provides a pressure signal indicative of unsteady pressure within the pipe at a corresponding axial location of the pipe. The spatial array includes at least two overlapping sub-arrays, with each sub-array including at least two of the sensors. Using the pressure signals, the signal processor determines a spatial correlation matrix for each of the sub-arrays and then averages the spatial correlation matrices from all of the sub-arrays to provide an averaged spatial correlation matrix, which is used to determine the parameter of the fluid. The averaged spatial correlation matrix may be input to an adaptive array processing algorithm. The parameter of the fluid may include, for example, at least one of: velocity, speed of sound, density, volumetric flow rate, mass flow rate, composition, entrained air, consistency, steam quality or wetness, vapor to mass ratio, liquid to solid ratio, enthalpy, and site of particles in the fluid.

In any of the embodiments described herein, the at least two pressure sensors may be selected from a group consisting of: piezoelectric, piezoresistive, strain gauge, PVDF, optical sensors, ported ac pressure sensors, accelerometers, velocity sensors, and displacement sensors. In various embodiments, the at least two pressure sensors are wrapped around at least a portion of the pipe and do not contact the fluid. The pipe may be open ended such that it can be positioned within the fluid flow for forming a portion of a sensing device.

The foregoing and other objects, and features of the present invention will become more apparent in light of the following detailed description of exemplary embodiments thereof.

BRIEF DESCRIPTION OF THE DRAWINGS

Referring now to the drawing wherein like items are numbered alike in the various Figures.

DETAILED DESCRIPTION

As described in U.S. patent application Ser. Nos. 10/007,749, 10/349,716, and 10/376,427, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process.

Figure 1:
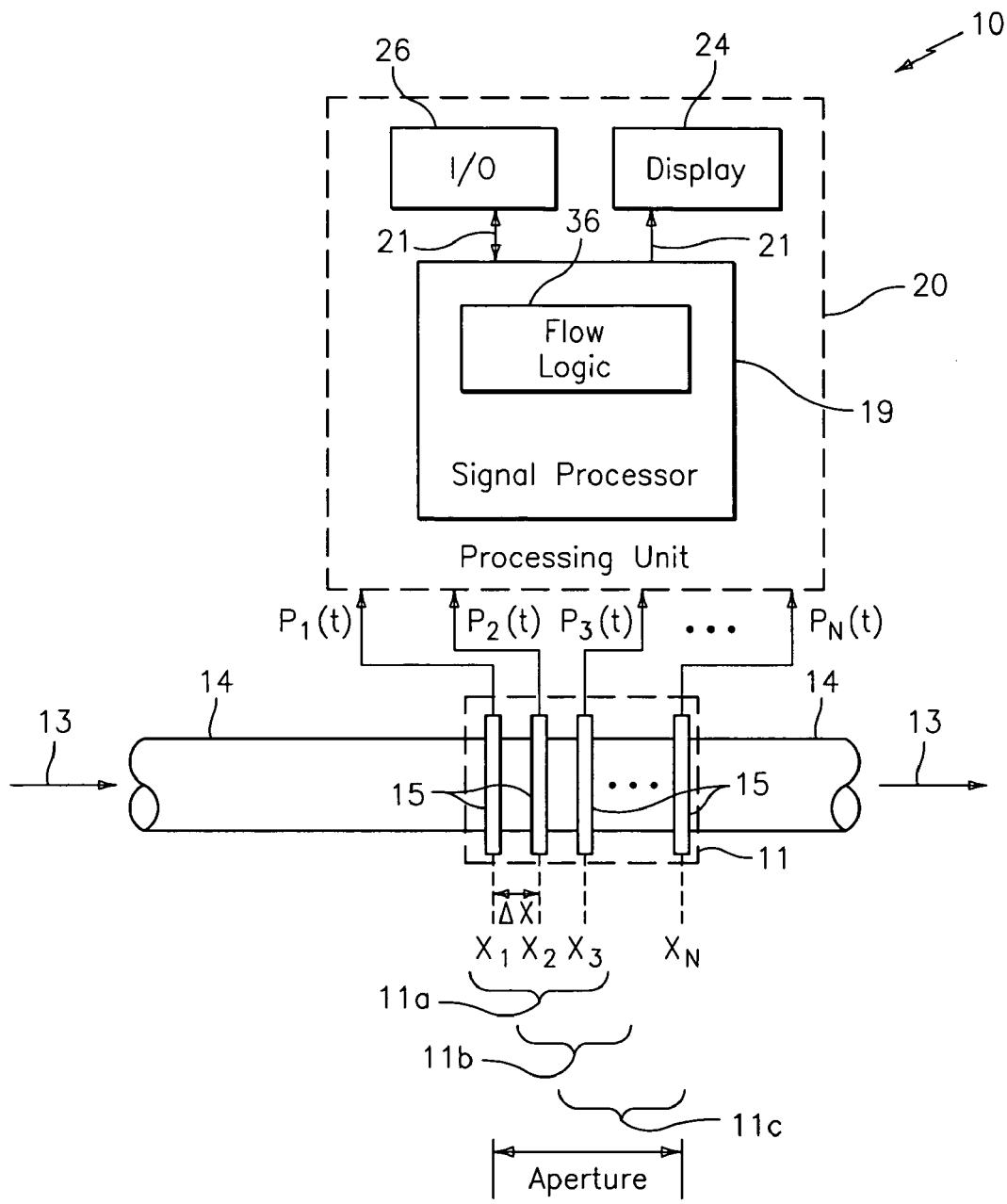
FIG. 1 is schematic diagram of an apparatus for determining at least one parameter associated with a fluid flowing in a pipe in accordance with various embodiments of the present invention.

Referring to FIG. 1, an apparatus 10 for measuring at least one parameter associated with a fluid 13 flowing within a pipe 14 is shown. The parameter of the fluid may include, for example, at least one of: velocity, speed of sound, density, volumetric flow rate, mass flow rate, composition, entrained air, consistency, steam quality or "wetness," vapor/mass ratio, liquid/solid ratio, enthalpy, and size of particles in the fluid 13.

The fluid 13 may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture. One example of a multiphase mixture that can be measured is a saturated vapor/liquid mixture, such as steam. The pipe 14 may be a tube, duct, conduit, or the like. As will be discussed hereinafter, the pipe 14 may be open ended and may be placed within the fluid 13 flow as part of a sensing device.

The apparatus 10 includes a spatial array 11 of at least two pressure sensors 15 disposed at different axial locations $x_1 \ldots x_N$ along the pipe 14. Each of the pressure sensors 15 provides a pressure signal P(t) indicative of unsteady pressure within the pipe 14 at a corresponding axial location $x_1 \ldots x_N$ of the pipe 14. A signal processor 19 receives the pressure signals $P_1(t) \ldots P_N(t)$ from the pressure sensors 15 in the array 11, determines the parameter of the fluid 13 using pressure signals from the pressure sensors 15, and outputs the parameter as a signal 21. The signal processor 19 applies array-processing techniques to the pressure signals $P_1(t) \ldots P_N(t)$ to determine the velocity, speed of sound of the fluid 13, and/or other parameters of the fluid 13. As will be described in further detail hereinafter, the array 11 includes at least two overlapping sub-arrays, as indicated at 11a, 11b, and 11c. Using the signals from the sensors 15, the signal processor 19 determines a spatial correlation matrix for each of the sub-arrays 11a, 11b, and 11c, and then averages the spatial correlation matrices from all of the sub-arrays to provide an averaged spatial correlation matrix, which is used as input into an array processing algorithm for determining the parameter of the fluid. This sub-array processing method has been found to produce a signal resolution that is better than that produced by a single array the size of a single sub-array for eliminating the modulation caused by the presence of coherent signals in the fluid 13 as may be the result of the signals arising from multipaths from a common source (e.g. through reflections).

While the apparatus 10 is shown as including four pressure sensors 15, it is contemplated that the array 11 of pressure sensors 15 includes two or more pressure sensors 15, each providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 pressure sensors 15. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desire update rate of the output parameter provided by the apparatus 10.

The signals $P_1(t) \ldots P_N(t)$ provided by the pressure sensors 15 in the array 11 are processed by the signal processor 19, which may be part of a larger processing unit 20. For example, the signal processor 19 may be a microprocessor and the processing unit 20 may be a personal computer or other general purpose computer. It is contemplated that the signal processor 19 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

To determine the one or more parameters 21 of the flow process, the signal processor 19 applies the data from the pressure sensors 15 to flow logic 36 executed by signal processor 19. The flow logic 36 is described in further detail hereinafter.

The signal processor 19 may output the one or more parameters 21 to a display 24 or another input/output (I/O) device 26. The I/O device 26 also accepts user input parameters 48 as may be necessary for the flow logic 36 and diagnostic logic 38. The I/O device 26, display 24, and signal processor 19 unit may be mounted in a common housing, which may be attached to the array 11 by a flexible cable, wireless connection, or the like. The flexible cable may also be used to provide operating power from the processing unit 20 to the array 11 if necessary.

Figure 2:
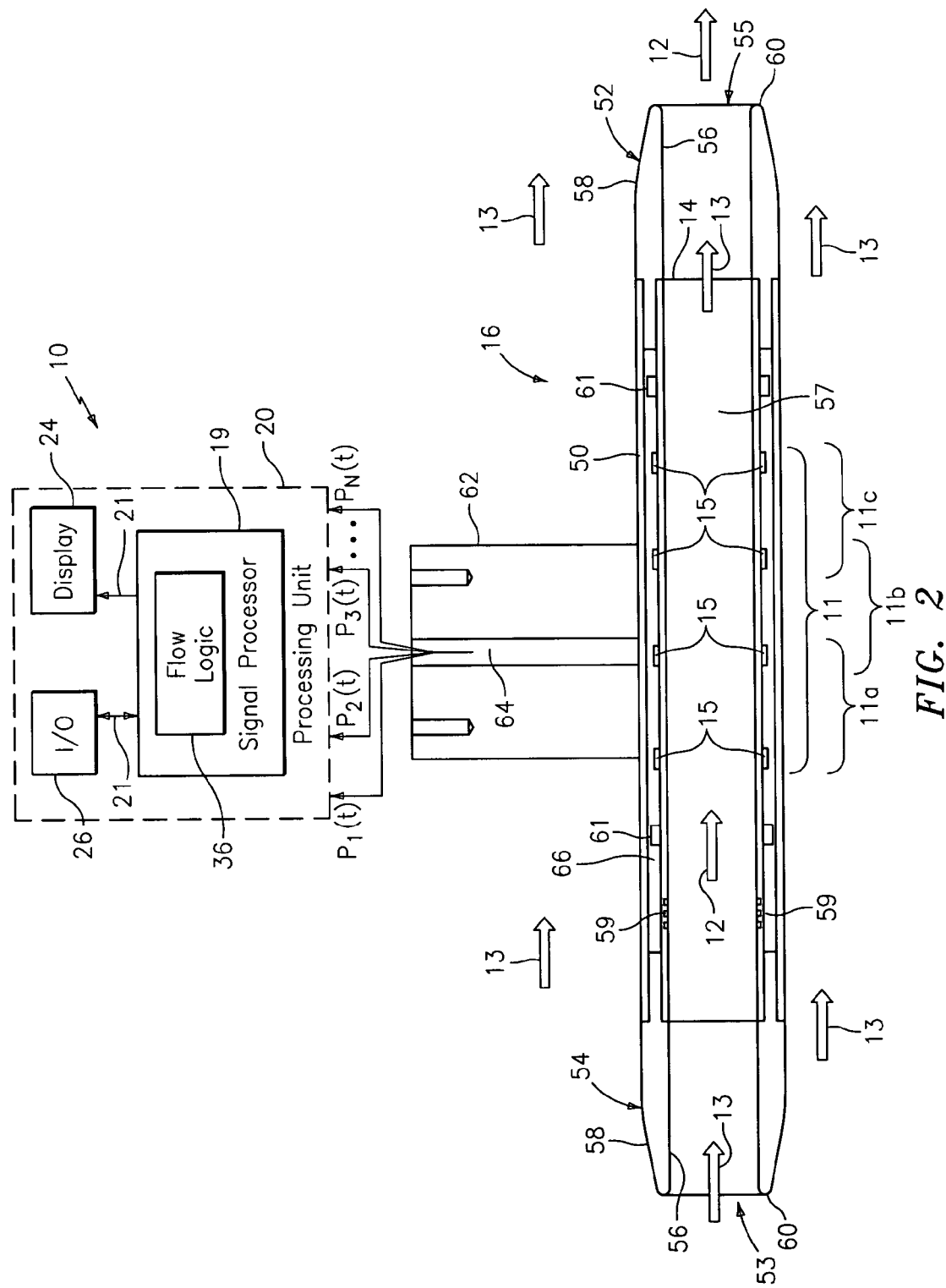
FIG. 2 is schematic diagram of an apparatus employing a sensing device for determining at least one parameter associated with a fluid flowing through the sensing device in accordance with various embodiments of the present invention.

FIG. 2 illustrates an embodiment of apparatus 10 wherein the pipe 14 forms an inner tube of a sensing device 16, which is placed in the fluid 13 flow. The array 11 of pressure sensors (or transducers) 15 are spaced axially along an outer surface 22 of the pipe 14. As in the previous embodiments, the pressure sensors 15 measure the unsteady pressures produced by acoustical and/or vortical disturbances within the pipe 14, which are indicative of a parameter of the fluid 13. The output signals ($P_1$–$P_N$) of the pressure sensors 15 are provided to the signal processor 19, which processes the signals and determines at least one parameter of the fluid 13. Specifically, the characteristics and parameters determined may include velocity, speed of sound, density, volumetric flow rate, mass flow rate, composition, entrained air, consistency, steam quality or "wetness," vapor/mass ratio, liquid/solid ratio, enthalpy, and size of particles in the fluid 13. To determine the one or more parameters 21 of the flow process, the signal processor 19 applies the data from the pressure sensors 15 to flow logic 36 executed by signal processor 19. The flow logic 36 is described in further detail hereinafter.

In the embodiment shown, the pipe (inner tube) 14 is disposed within a tubular, outer housing 50 to provide an input port 53 and output port 55 for the fluid 13 to pass through. The pipe 14 is generally cylindrical in shape having an axial bore 57 with a circular cross-section. The invention, however, contemplates that the pipe 14 may be of any shape or cross-sectional shape, such as squares, oval rectangular or any other polygonal shape. The cross-sectional shape may even be different along the length of the pipe 14.

A pair of end caps 52,54 is disposed at the respective ends of the pipe 14 and outer housing 50 to maintain and support the pipe 14 coaxially within the housing 50. The housing 50 and end caps 52,54 protect the array of sensors 15 disposed along the pipe 14 from the fluid 13, and also act as an insulator or isolator to prevent external acoustic and/or unsteady pressure disturbances from affecting the sensors 15. The end caps 52,54 have a central bore 56 with a inner diameter substantially the same as the inner diameter of the pipe 14. The outer surface 58 of the end caps 52,54 are tapered and the outer ends 60 are rounded to provide an aerodynamic profile to reduce the drag of the flow (e.g., steam) over the sensing device 16 to reduce the wind resistance and stresses thereon. The aerodynamic profile also reduces the disturbance of the flow of the fluid 13. The aerodynamic characteristics are particularly important for high speed steam flow (e.g., 0.7 Mach), such as steam exiting a gas turbine exhaust.

While the sensing device 16 has a pair of end caps 52,54, it is contemplated that a sensing device 16 having no discrete end caps and that the pipe 14 extends the length of sensing device 16.

While the pipe 14 of the sensing device 16 is shown to have a substantially axial bore 57 therethrough, it is contemplated that the bore may be non-axial, such as having a bend in the pipe 14. Of course, such a non-axial bore would increase the drag of the sensing device 16 within the fluid 13 flow. While in most instances it is not necessary, it is contemplated that providing ridges 59 at the input end of the pipe 14 to create vortical disturbances to be measured. These ridges 59 can be formed by grinding circumferential grooves in the inner wall of the pipe 14 or providing circumferential ridges extending from the wall.

One or more acoustic sources 61 may be used to enable the measurement of the speed of sound propagating through the fluid 13 for instances of acoustically quiet flow. The acoustic sources 61 may be disposed at the input end or output end of the sensing device 16, or at both ends as shown. One should appreciate that in most instances the acoustics sources are not necessary and the apparatus 10 passively detects the acoustic ridge provided in the fluid 13.

The embodiment of the sensing device 16 shows a single input and output port 53,55, however, it is contemplated that the sensing device may have a plurality of input ports and/or output ports that feed into and out of the central portion of the pipe 14 where the sensor array 11 is disposed. While contemplated, one will appreciate that this arrangement may result in additional drag being placed upon the sensing device 16 and may result in additional disturbance to the fluid 13.

The sensing device 16 further includes a fin-shaped support structure 62 extending from the center of the housing 50 for mounting the sensing device 16 to a wall or other support. The support structure 62 includes a bore 64, disposed therethrough to communicate with the space 66 disposed between the pipe 14 and the housing 50. The bore 64 provides a means to run the conductors of the pressure sensors 15 to the signal processor 19. The support structure 62 is oriented to reduce wind resistance to minimize disturbance of the fluid 12 flow.

Similar to that described in U.S. PCT Application No. PCT/US00/17419 which is incorporated herein by reference, the space 66 between the pipe 14 and the housing 50 may be evacuated to provide "vacuum backed" sensors 15. Evacuating the space 66 provides additional insulation/isolation to prevent external acoustic and/or unsteady pressure disturbances from affecting the sensors 15.

Figure 3:
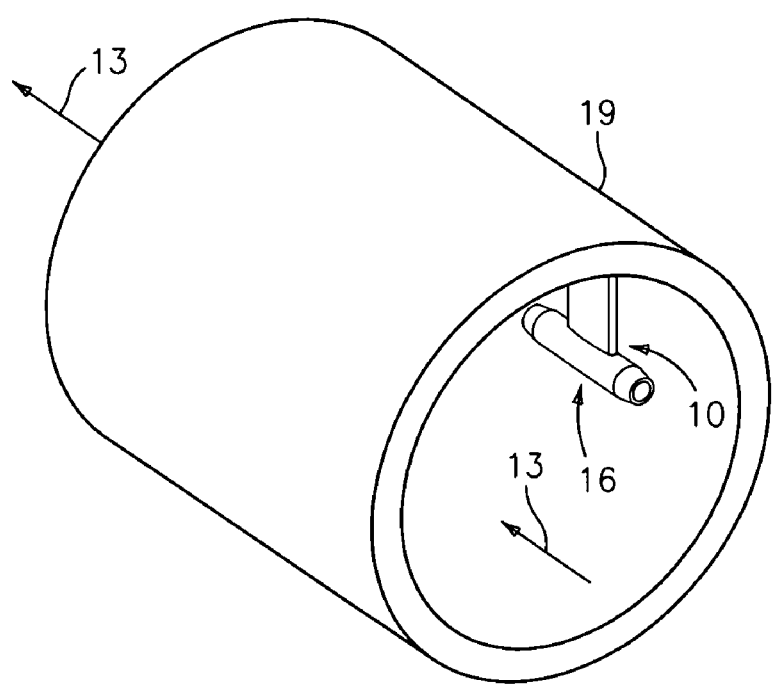
FIG. 3 is an isometric view of the sensing device placed in a flow of fluid within a pipe.

The apparatus 10 of FIG. 2 may be used a number of different ways. For example as shown in FIG. 3, the sensing device 16 of the apparatus 10 may be mounted within a pipe 19 (e.g., a duct, conduit, tube, etc.), to measure the fluid 13 passing therethrough. The sensing device 16 is particularly useful for large diameter pipes 19 having a large cross-sectional area, such as smokestacks, exhaust ducts or HVAC systems. The utility of the sensing device 16 is especially evident for measuring the flow of a fluid 13 that is not confined within piping or ducting. For example, the sensing device 16 may be mounted within or proximate a gas (e.g., low-pressure steam) turbine to measure the steam "wetness" or other parameters of the fluid 13 exiting the exhaust duct of the turbine. Other applications or uses of the sensing device 16 include mounting the sensing device 16 to the exterior of a vehicle such as an automobile, airplane and a train to measure parameters of the air or velocity of the vehicle. Further, the sensing device 16 may be mounted to the bottom of a ship to measure the SOS propagating through the sensing device 16, or mounted to the outer hull of a submarine to measure the speed of sound at different depths in the ocean, as well as other parameters. Generally, the sensing device 16 may be used in any application that one may use a pitot-static probe. The sensing device 16 may also be used to measure parameters of a river flow, an open conduit or partially filled pipe.

Figure 4:
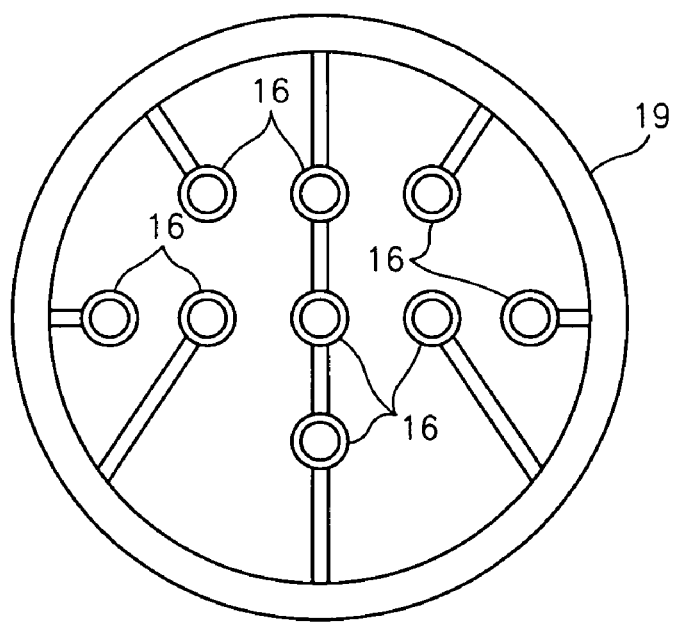
FIG. 4 is a cross-sectional view of a plurality of sensing devices placed in a flow of fluid within a pipe.

The sensing device 16 is particularly useful in characterizing the pattern of the fluid 13 within a pipe or unconfined space. For example, as shown in FIG. 4, one or more sensing devices 16 may be disposed at different locations across the area of the fluid 13 flow. The data provided by each of the sensing devices 16 and the known location of the sensing devices 16 enables one to characterize the flow pattern. For example, one sensing device 16 may be disposed adjacent to the wall of a pipe 19 and another sensing device 16 may be disposed at a central position within the pipe 19 to characterize the velocity and vapor/mass (e.g. steam wetness) at the two locations. One will appreciate that any number of sensing devices 16 may be disposed at number of locations within the fluid 13 flow.

In any of the embodiments described herein, the pressure sensors 15 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor and the pipe 14. The sensors 15 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 14. If desired, for certain applications, gratings may be detached from (or strain or acoustically isolated from) the pipe 14 if desired. It is also within the scope of the present invention that any other strain sensing technique may be used to measure the variations in strain in the pipe 14, such as highly sensitive piezoelectric, electronic or electric, strain gages attached to or embedded in the pipe 14.

In various embodiments of the present invention, a piezoelectronic pressure transducer may be used as one or more of the pressure sensors and it may measure the unsteady (or dynamic or ac) pressure variations inside the pipe 14 by measuring the pressure levels inside the pipe. In one embodiment of the present invention, the sensors 14 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors 15 may incorporate a built-in MOSFET microelectronic amplifier to convert the high-impedance charge output into a low-impedance voltage signal. The sensors 15 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the pressure sensors 15 may include a piezoelectric sensor that provides a piezoelectric material to measure the unsteady pressures of the fluid 13. The piezoelectric material, such as the polymer, polarized fluoropolymer, PVDF, measures the strain induced within the process pipe 14 due to unsteady pressure variations within the fluid 13. Strain within the pipe 14 is transduced to an output voltage or current by the attached piezoelectric sensors 15.

The PVDF material forming each piezoelectric sensor 15 may be adhered to the outer surface of a steel strap that extends around and clamps onto the outer surface of the pipe 14. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140C) (co-polymers)

Flow Logic

Velocity Processing

Figure 5:
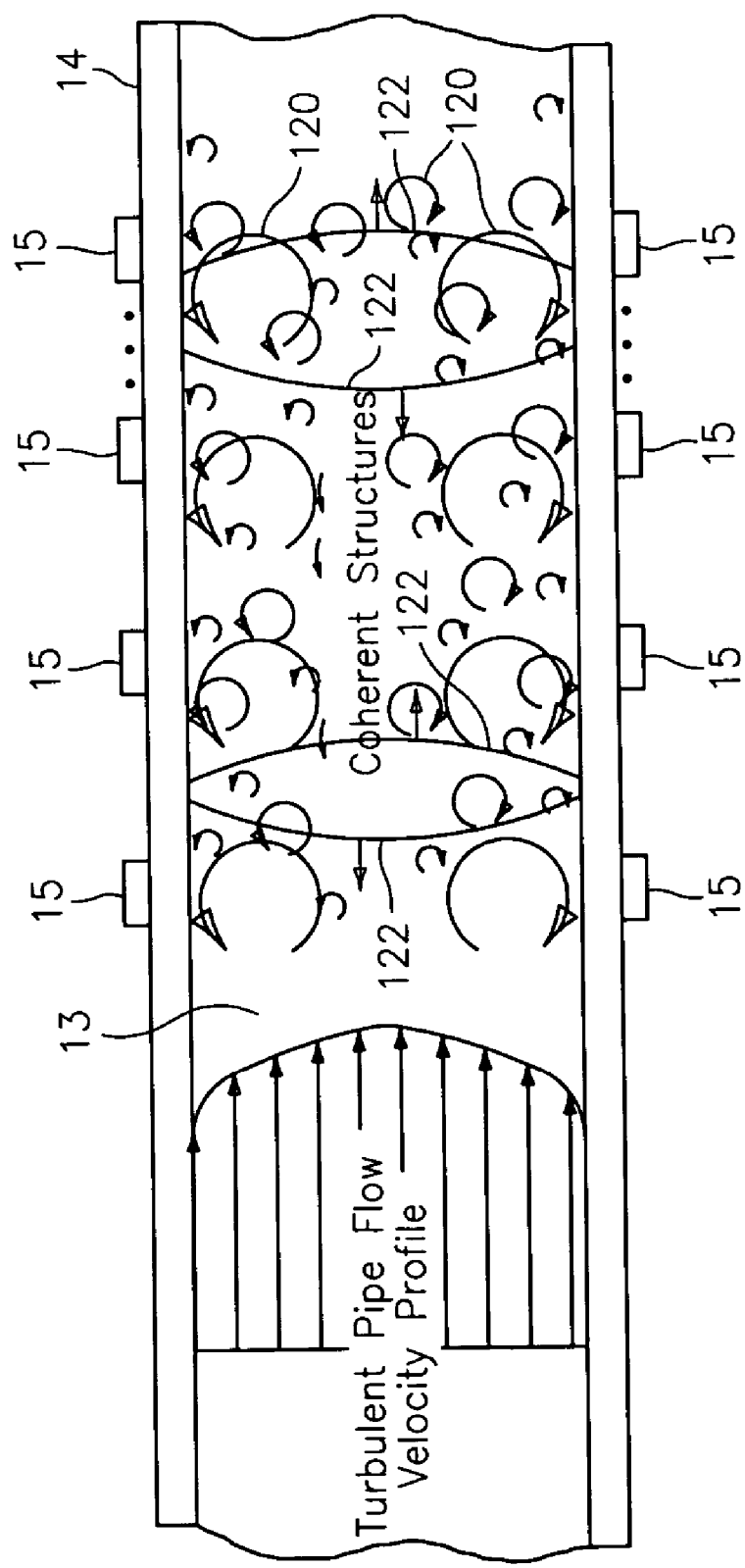
FIG. 5 is a cross-sectional view of a pipe having coherent structures therein.

As previously described with reference to FIG. 1 and FIG. 2, the array 11 of at least two sensors 15 located at two locations $x_1, x_2$ axially along the pipe 14 sense respective stochastic signals propagating between the sensors 15 within the pipe 14 at their respective locations. Each sensor 15 provides a signal indicating an unsteady pressure at the location of each sensor 15, at each instant in a series of sampling instants. One will appreciate that the array 11 may include more than two sensors 15 distributed at locations $x_1 \ldots x_N$. The pressure generated by the convective pressure disturbances (e.g., eddies 120, see FIG. 5) may be measured through strain-based sensors 15 and/or pressure sensors 15. The sensors 15 provide analog pressure time-varying signals $P_1(t), P_2(t), P_3(t) \ldots P_N(t)$ to the signal processor 19, which in turn applies these signals $P_1(t), P_2(t), P_3(t), \ldots P_N(t)$ to the flow logic 36.

Figure 6:
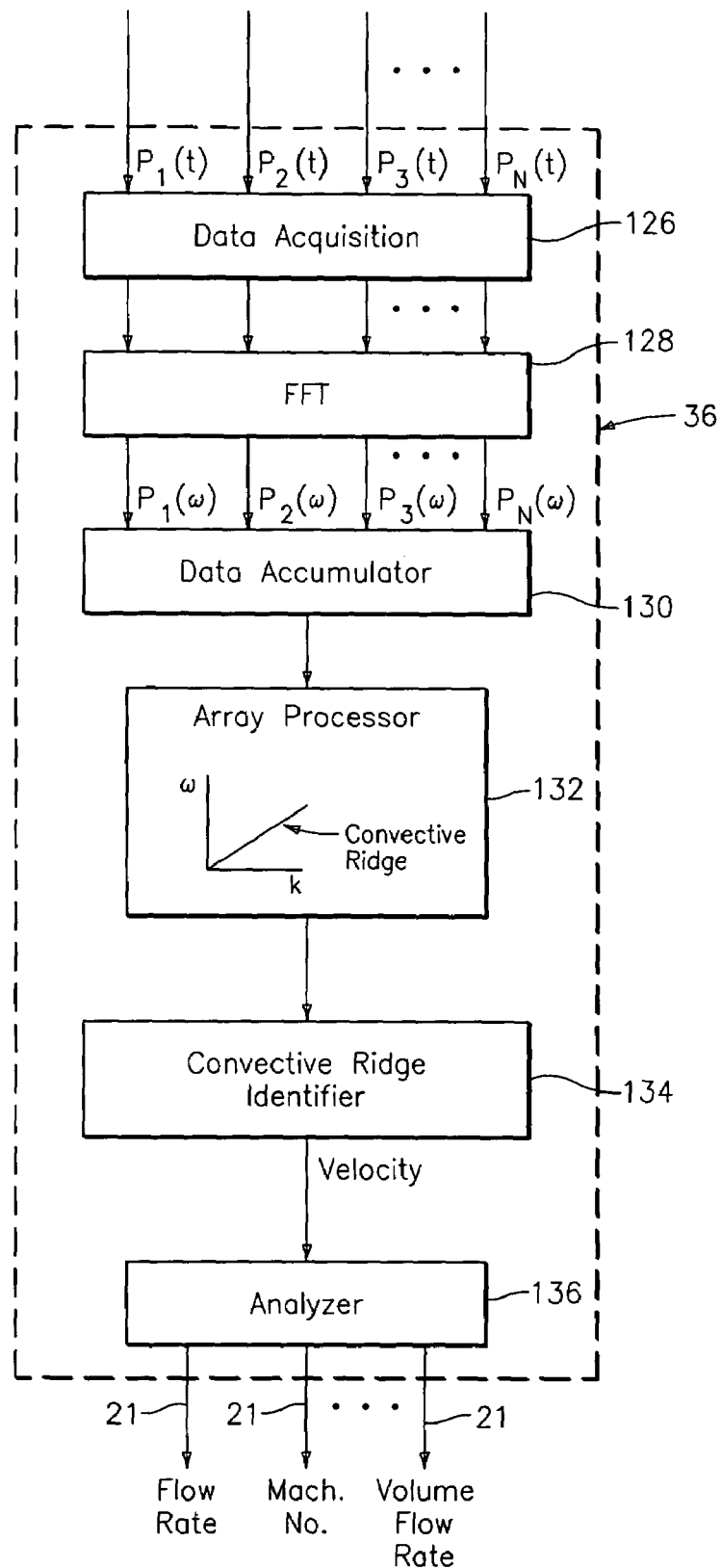
FIG. 6 is a block diagram of a first embodiment of a flow logic used in the apparatus of the present invention.

Referring to FIG. 6, an example of flow logic 36 is shown. As shown in FIG. 6, the signal processor 19 may include a data acquisition unit 126 that converts the analog signals $P_1(t) \ldots P_N(t)$ to respective digital signals and provides the digital signals $P_1(t) \ldots P_N(t)$ to fast Fourier transform (FFT) logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)$–$P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S. patent application Ser. No. 10/007,736 and U.S. patent application Ser. No. 09/729,994, filed Dec. 4, 200, now U.S. Pat. No. 6,609,069, which are incorporated herein by reference.

A data accumulator 130 accumulates the frequency signals $P_1(\omega)$–$P_N(\omega)$ over a sampling interval, and provides the data to an array processor 132, which performs a spatial-temporal (two-dimensional) transform of the sensor data, from the xt domain to the k-$\omega$ domain, and then calculates the power in the k-$\omega$ plane, as represented by a k-$\omega$ plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi f$.

The prior art teaches many algorithms of use in spatially and temporally decomposing a signal from a phased array of sensors, and the present invention is not restricted to any particular algorithm. One particular array-processing algorithm used by the array processor 32 is the Minimum Variance Distortionless Response beamformer (aka MVDR or Capon). Where array processor 132 employs array-processing algorithms such as the MVDR algorithm, one input to the array processor 132 is the spatial correlation matrix, which is generated by the data accumulator 130. In matrix notation, the spatial correlation matrix can be described as the outer product of the sensor Fourier transform vector (the Fourier transform of each sensor at a given frequency) with itself. Stated another way, the spatial correlation matrix is an N×N matrix (where N is the number of sensors 15) that contains the magnitude and phase relationship of all combinations of sensors 15 within the array 11 at a given frequency.

The goal of array processing is to identify, isolate and, parameterize a group of signals accurately and precisely. The ability of an array to resolve individual signals and, therefore to distinguish signals within a group, depends in general on the array aperture and the noise level under which the measurements are made. In the case of a regular linear array the aperture also determines the number of array elements and, in turn, the amount of noise mitigation gained in array processing.

These advantages can be severely reduced when some of the signals are coherent; usually as a result of the signals arising from multipaths from a common source (e.g. through reflections). The effect of these signals is a modulation of the correlation matrix that depends upon the relative strength of the components and the phase shift between the signals. These effects significantly diminish both the perceived signal resolution and strength.

In the present invention, sub-array processing is performed by effectively dividing the array 11, as shown in FIG. 1 and FIG. 2, into at least two overlapping sub-arrays 11a, 11b, and 11c, with each sub-array including at least two of the sensors 15. Normally, reducing the array aperture incurs too severe a cost of diminished resolution. However, in the presence of coherent signals, a large array can be sectioned into overlapping sub-arrays which when averaged together eliminate the modulation caused by the presence of coherent signals and together produce a signal resolution that is better than that produced by a single array of the size of the sub-array.

Figure 7:
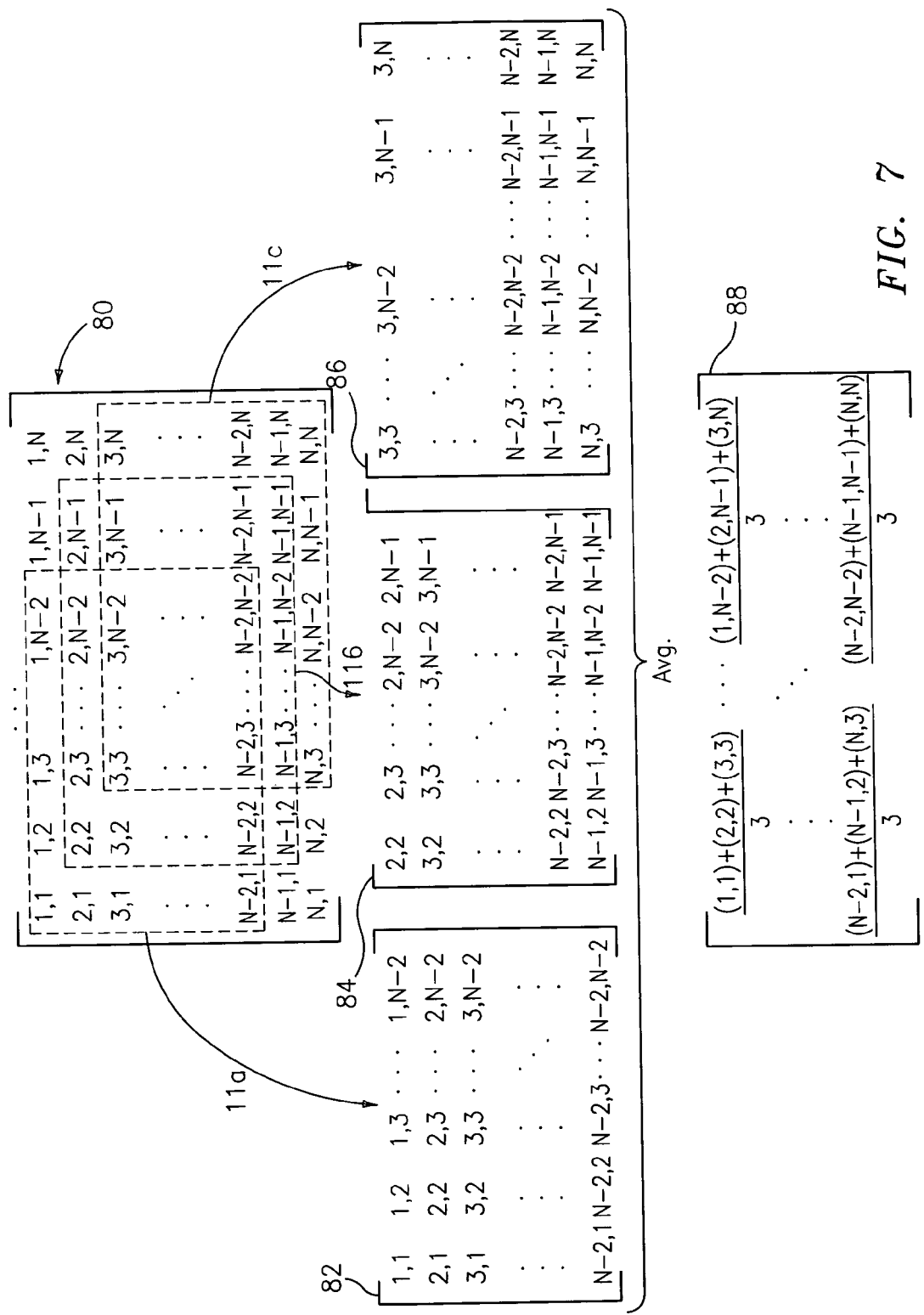
FIG. 7 depicts a plurality of spatial correlation matrices resulting from the sub-array processing of the present invention.

FIG. 7 depicts a spatial correlation matrix, indicated at 80, for the entire array 11. In the spatial correlation matrix, N is the number of sensors 15, each row/column pairing in the matrix represents the Fourier transform of a single sensor 15 at a given frequency, and each row and each column represent the Fourier transform vector for the array 11. In the present embodiment, the data accumulator 130 of FIG. 6 employs a sub-array processing technique that effectively divides the spatial correlation matrix 80 into a plurality of spatial correlation matrices 82, 84, and 86, one for each overlapping sub-array 11a, 11b, and 11c, respectively, in the array 11. While the embodiment of FIG. 1, FIG. 2, and FIG. 7 depict three sub-arrays, it is contemplated that two or more sub-arrays may be used, with each sub-array including at least two sensors 15.

Each spatial correlation matrix 82, 84, 86 can be described as the outer product of the sensor Fourier transform vector for the corresponding sub-array (the Fourier transform of each sensor at a given frequency) with itself. Stated another way, each spatial correlation matrix 82, 84, 86 is an $(N-(M-1)) \times (N-(M-1))$ matrix, where N is the number of sensors 15 in the array 11, and M is the number of sub-arrays. Each spatial correlation matrix 82, 84, 86 contains the magnitude and phase relationship of all combinations of sensors 15 within the sub-array at a given frequency.

The sub-array processing can only be applied to regular linear array in which all equal sized sub-arrays have similar structure. The most effective sub-array structure depends upon the number of coherent interfering signals and results from a compromise between the number of sub-arrays necessary to reduce the coherent modulation and the reduced signal resolution due to the smaller sub-array apertures.

After the spatial correlation matrices 82, 84, 86 are generated for each sub-array at a given frequency, the spatial correlation matrices 82, 84, 86 at the given frequency are then averaged to provide an averaged spatial correlation matrix 88 for the given frequency. In the averaged spatial correlation matrix 88, each row/column pairing represents the average Fourier transform of from corresponding sensors 15 in the sub-arrays. This averaged spatial correlation matrix 88 is used as an input to the array processing algorithm employed by the array processor 132 of FIG. 6.

While the Capon method is described above as one array processing algorithm, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the k-ω plane, as represented by a k-ω plot (see FIG. 8) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 15.

The present invention may use temporal and spatial filtering to precondition the signals to effectively filter out the common mode characteristics Pcommon mode and other long wavelength (compared to the sensor spacing) characteristics in the pipe 14 by differencing adjacent sensors 15 and retain a substantial portion of the stochastic parameter associated with the flow field and any other short wavelength (compared to the sensor spacing) low frequency stochastic parameters.

Figure 8:
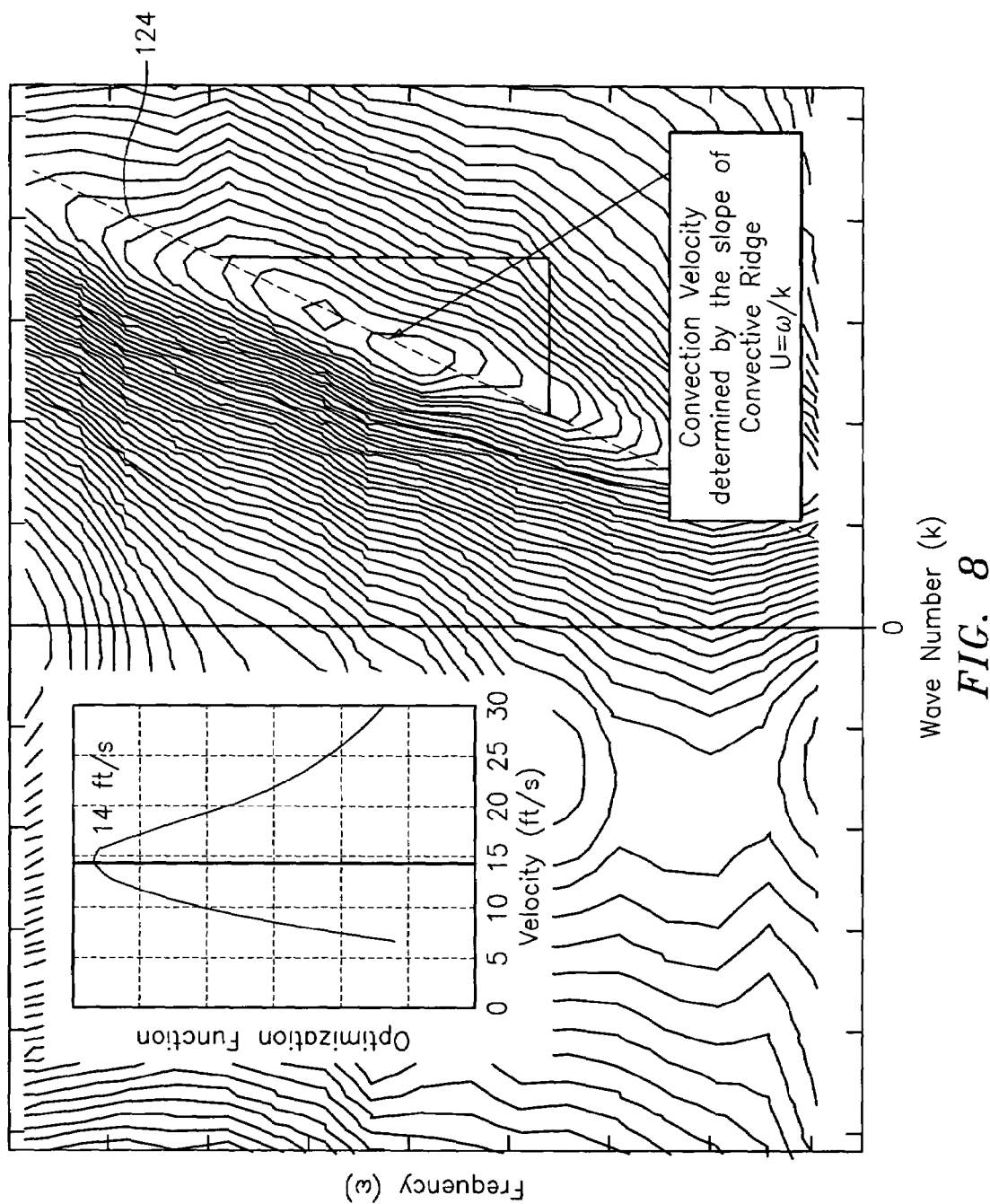
FIG. 8 is a k-ω plot of data processed from an apparatus embodying the present invention that illustrates slope of the convective ridge, and a plot of the optimization function of the convective ridge.

In the case of suitable turbulent eddies 120 (see FIG. 5) being present, the power in the k-ω plane shown in a k-ω plot of FIG. 8 shows a convective ridge 124. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 124 with some slope, the slope indicating the flow velocity.

Referring again to FIG. 6, once the power in the k-ω plane is determined, a convective ridge identifier 134 uses one or another feature extraction method to determine the location and orientation (slope) of any convective ridge 124 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

An analyzer 136 examines the convective ridge information including the convective ridge orientation (slope). Assuming the straight-line dispersion relation given by k=ω/u, the analyzer 136 determines the flow velocity and/or volumetric flow, which are output as parameters 21. The volumetric flow is determined by multiplying the cross-sectional area of the inside of the pipe with the velocity of the process flow.

Speed of Sound (SOS) Processing

Figure 9:
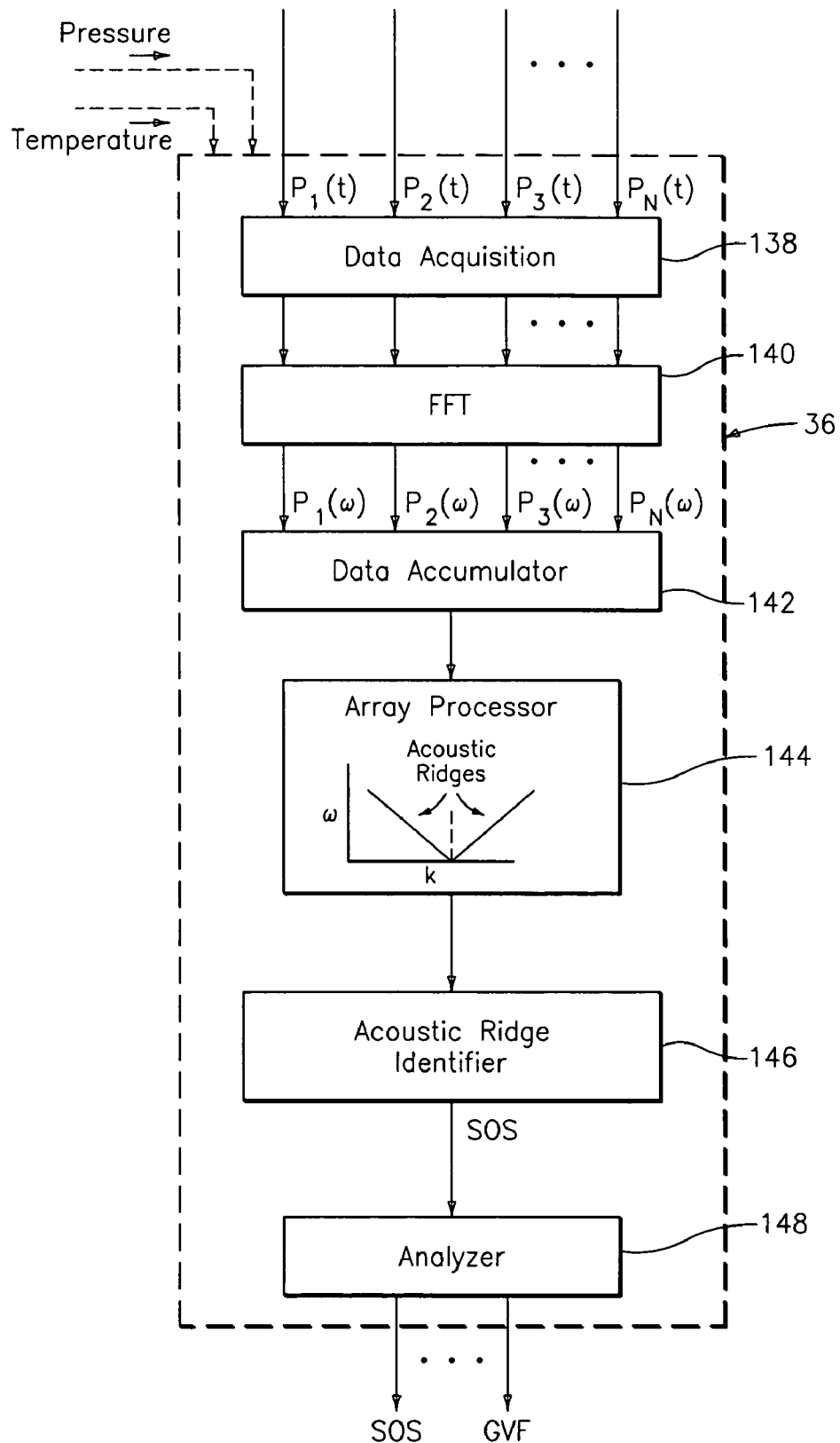
FIG. 9 is a block diagram of a second embodiment of a flow logic used in the apparatus of the present invention.

Referring to FIG. 9, another example of flow logic 36 is shown. While the examples of FIG. 6 and FIG. 9 are shown separately, it is contemplated that the flow logic 36 may perform all of the functions described with reference to FIG. 6 and FIG. 9. As previously described with reference to FIG. 1 and FIG. 2, the array 11 of at least two sensors 15 located at two at least two locations x1,x2 axially along the pipe 14 sense respective stochastic signals propagating between the sensors within the pipe at their respective locations. Each sensor 15 provides a signal indicating an unsteady pressure at the location of each sensor 15, at each instant in a series of sampling instants. One will appreciate that the sensor array 11 may include more than two pressure sensors 15 distributed at locations $x_1 \ldots x_N$. The pressure generated by the acoustic pressure disturbances (e.g., acoustic waves 122, see FIG. 8) may be measured through strained-based sensors and/or pressure sensors. The sensors 15 provide analog pressure time-varying signals $P_1(t),P_2(t),P_3(t), \ldots P_N(t)$ to the flow logic 36. The flow logic 36 processes the signals $P_1(t),P_2(t),P_3(t), \ldots P_N(t)$ from the sensors 15 to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13.

The signal processor 19 receives the pressure signals from the array 11 of sensors 15. As shown in FIG. 9, a data acquisition unit 138 digitizes the pressure signals $P_1(t) \ldots P_N(t)$ associated with the acoustic waves 122 propagating through the pipe 14. Similarly to the FFT logic 128 of FIG. 6, an FFT logic 140 calculates the Fourier transform of the digitized time-based input signals $P_1(t) \ldots P_N(t)$ and provides complex frequency domain (or frequency based) signals $P_1(\omega),P_2(\omega),P_3(\omega), \ldots P_N(\omega)$ indicative of the frequency content of the input signals.

A data accumulator 142 accumulates the frequency signals $P_1(\omega) \ldots P_N(\omega)$ over a sampling interval and provides the accumulated signals as input to an array processor 144. One input to the array processor 144 is the spatial correlation matrix, which is generated by the data accumulator 142. In matrix notation, the spatial correlation matrix can be described as the outer product of the sensor Fourier transform vector (the Fourier transform of each sensor at a given frequency) with itself. Stated another way, the spatial correlation matrix is an N×N matrix (where N is the number of sensors 15) that contains the magnitude and phase relationship of all combinations of sensors 15 within the array 11 at a given frequency.

As previously noted, the goal of array processing is to identify, isolate and, parameterize a group of signals accurately and precisely. The ability of an array to resolve individual signals and, therefore to distinguish signals within a group, depends in general on the array aperture and the noise level under which the measurements are made. In the case of a regular linear array the aperture also determines the number of array elements and, in turn, the amount of noise mitigation gained in array processing.

These advantages can be severely reduced when some of the signals are coherent; usually as a result of the signals arising from multipaths from a common source (e.g. through reflections). The effect of these signals is a modulation of the correlation matrix that depends upon the relative strength of the components and the phase shift between the signals. These effects significantly diminish both the perceived signal resolution and strength.

In the present invention, sub-array processing is performed by effectively dividing the array 11, as shown in FIG. 1 and FIG. 2, into at least two overlapping sub-arrays 11a, 11b, and 11c, with each sub-array including at least two of the sensors 15. Normally, reducing the array aperture incurs too severe a cost of diminished resolution. However, in the presence of coherent signals, a large array can be sectioned into overlapping sub-arrays which when averaged together eliminate the modulation caused by the presence of coherent signals and together produce a signal resolution that is better than that produced by a single array of the size of the sub-array.

FIG. 7 depicts a spatial correlation matrix, indicated at 80, for the entire array 11. In the spatial correlation matrix, N is the number of sensors 15, each row/column pairing in the matrix represents the Fourier transform of a single sensor 15 at a given frequency, and each row and each column represent the Fourier transform vector for the array 11. In the present embodiment, the data accumulator 130 of FIG. 6 employs a sub-array processing technique that effectively divides the spatial correlation matrix 80 into a plurality of spatial correlation matrices 82, 84, and 86, one for each overlapping sub-array 11a, 11b, and 11c, respectively, in the array 11. While the embodiment of FIG. 1, FIG. 2, and FIG. 7 depict three sub-arrays, it is contemplated that two or more sub-arrays may be used, with each sub-array including at least two sensors 15.

Each spatial correlation matrix 82, 84, 86 can be described as the outer product of the sensor Fourier transform vector for the corresponding sub-array (the Fourier transform of each sensor at a given frequency) with itself. Stated another way, each spatial correlation matrix 82, 84, 86 is an $(N-(M-1)) \times (N-(M-1))$ matrix, where N is the number of sensors 15 in the array 11, and M is the number of sub-arrays. Each spatial correlation matrix 82, 84, 86 contains the magnitude and phase relationship of all combinations of sensors 15 within the sub-array at a given frequency.

The sub-array processing can only be applied to regular linear array in which all equal sized sub-arrays have similar structure. The most effective sub-array structure depends upon the number of coherent interfering signals and results from a compromise between the number of sub-arrays necessary to reduce the coherent modulation and the reduced signal resolution due to the smaller sub-array apertures.

After the spatial correlation matrices 82, 84, 86 are generated for each sub-array at a given frequency, the spatial correlation matrices 82, 84, 86 at the given frequency are then averaged to provide an averaged spatial correlation matrix 88 for the given frequency. In the averaged spatial correlation matrix 88, each row/column pairing represents the average Fourier transform of from corresponding sensors 15 in the sub-arrays. This averaged spatial correlation matrix 88 is used as an input to the array processing algorithm employed by the array processor 144 of FIG. 9.

The array processor 144 performs a spatial-temporal (two-dimensional) transform of the sensor data, from the xt domain to the k-ω domain, and then calculates the power in the k-ω plane, as represented by a k-ω plot. To calculate the power in the k-ω plane, as represented by a k-ω plot (see FIG. 11) of either the signals or the differenced signals, the array processor 144 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15.

Figure 10:
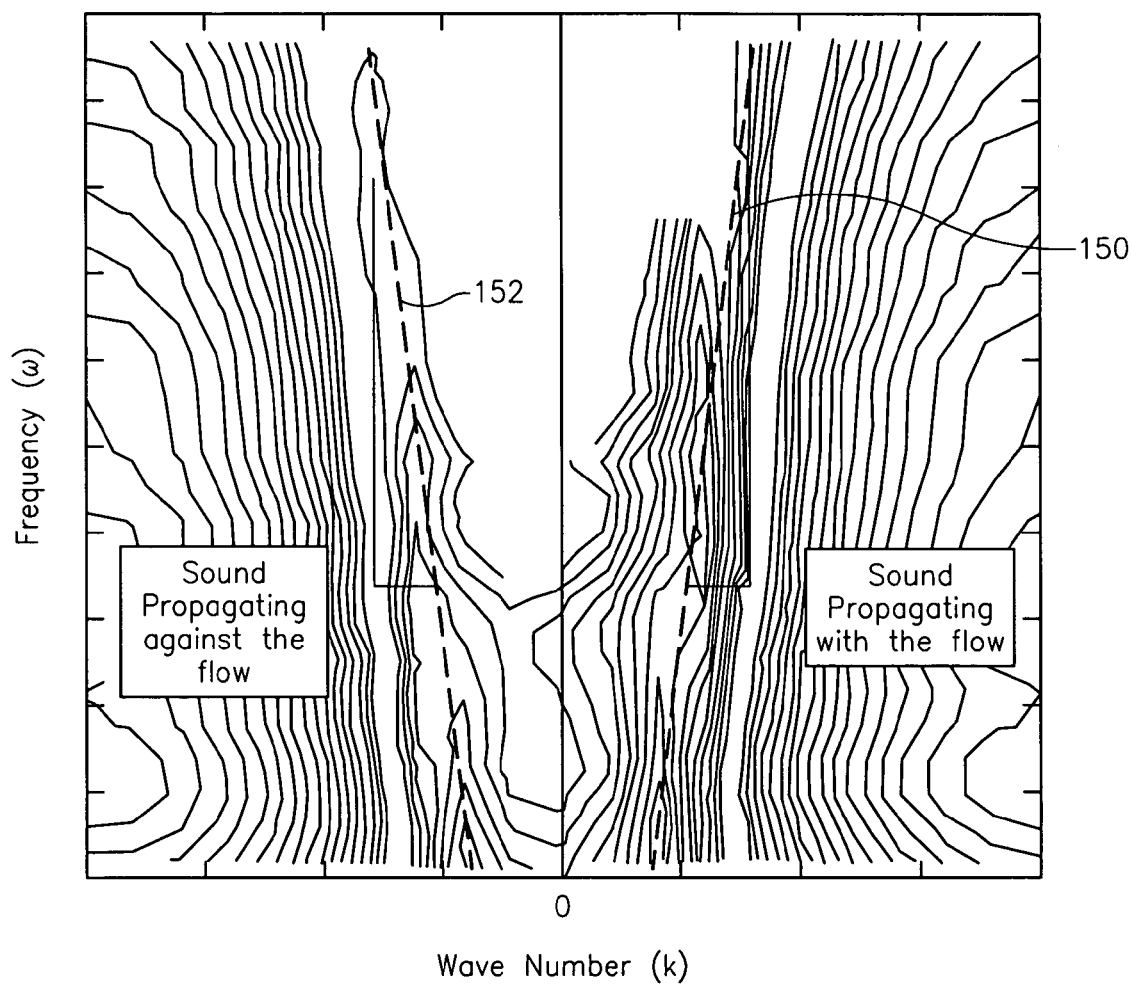
FIG. 10 a kω plot of data processed from an apparatus embodying the present invention that illustrates slope of the acoustic ridges.

In the case of suitable acoustic waves 122 being present in both axial directions, the power in the k-ω plane shown in a k-ω plot of FIG. 10 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 150, 152 with some slope, the slope indicating the speed of sound.

The power in the k-ω plane so determined is then provided to an acoustic ridge identifier 146, which uses one or another feature extraction method to determine the location and orientation (slope) of any acoustic ridge present in the left and right k-ω plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 6, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 13 is using array processing techniques to define an acoustic ridge in the k-ω plane as shown in FIG. 10. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of sensors 15 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2 + Bx + C = 0$$

wherein x is the speed of sound, $A = 1 + rg/rl*(K_{eff}/P - 1) - K_{eff}/P$, $B = K_{eff}/P - 2 + rg/rl$; $C = 1 - K_{eff}/rl*a_{meas}2)$; Rg=gas density, rl=liquid density, $K_{eff}$=effective K (modulus of the liquid and pipewall), P=pressure, and $a_{meas}$=measured speed of sound.

Effectively, $$\text{Gas Voulume Fraction } (GVF) = (-B + sqrt(B^2 - 4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix} a_{mix\infty}^2} = \sum_{i=1}^{N} \frac{\phi_i}{\rho_i a_i^2} \text{ where } \rho_{mix} = \sum_{i=1}^{N} \rho_i \phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity (aeff) for one dimensional compression is given by the following expression:

$$a_{eff} = \frac{1}{\sqrt{\frac{1}{a_{mix\infty}^2} + \rho_{mix} \frac{2R}{Et}}} \qquad (eq\ 1)$$

Figure 11:
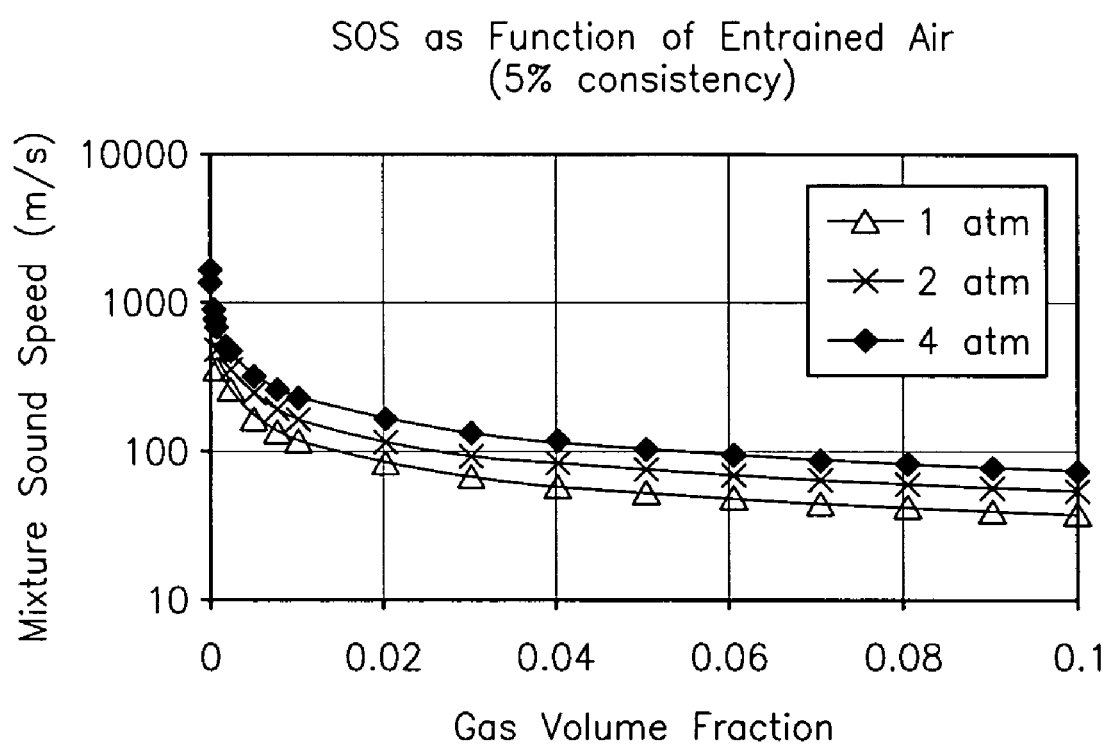
FIG. 11 is a plot of mixture sound speed as a function of gas volume fraction for a 5% consistency slurry over a range of process pressures.

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 11.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f \left(1 + \omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\rho_p$ is the volumetric phase fraction of the particles in the mixture.

Figure 12:
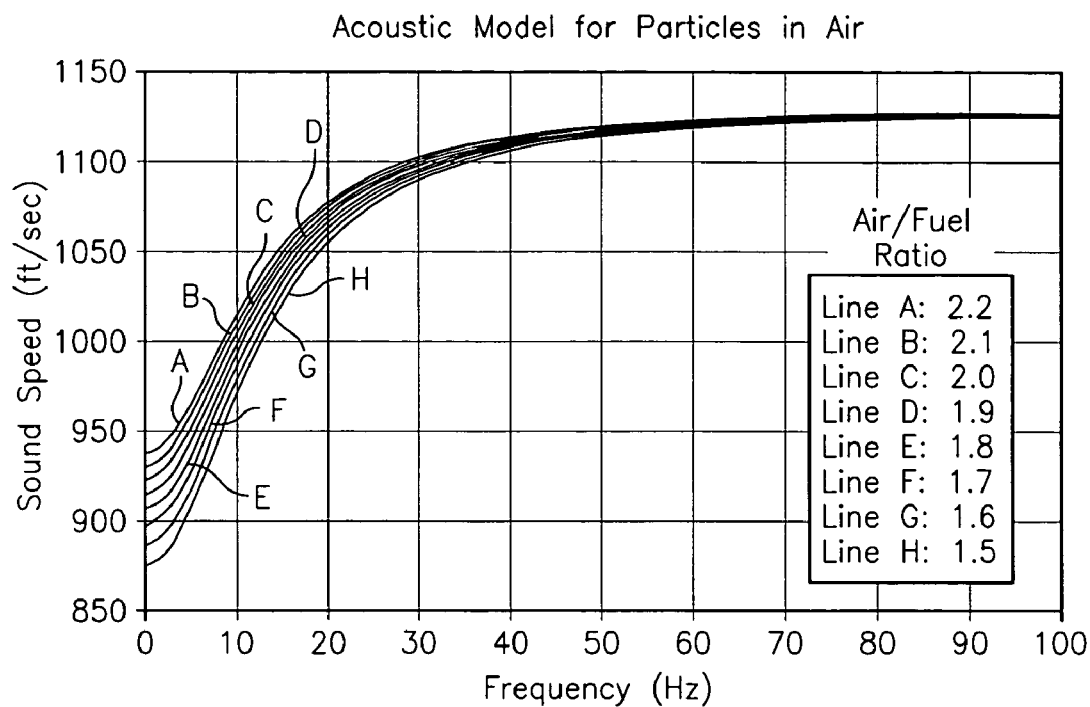
FIG. 12 is a plot of sound speed as a function of frequency for air/particle mixtures with fixed particle size and varying air-to-particle mass ratio.
Figure 13:
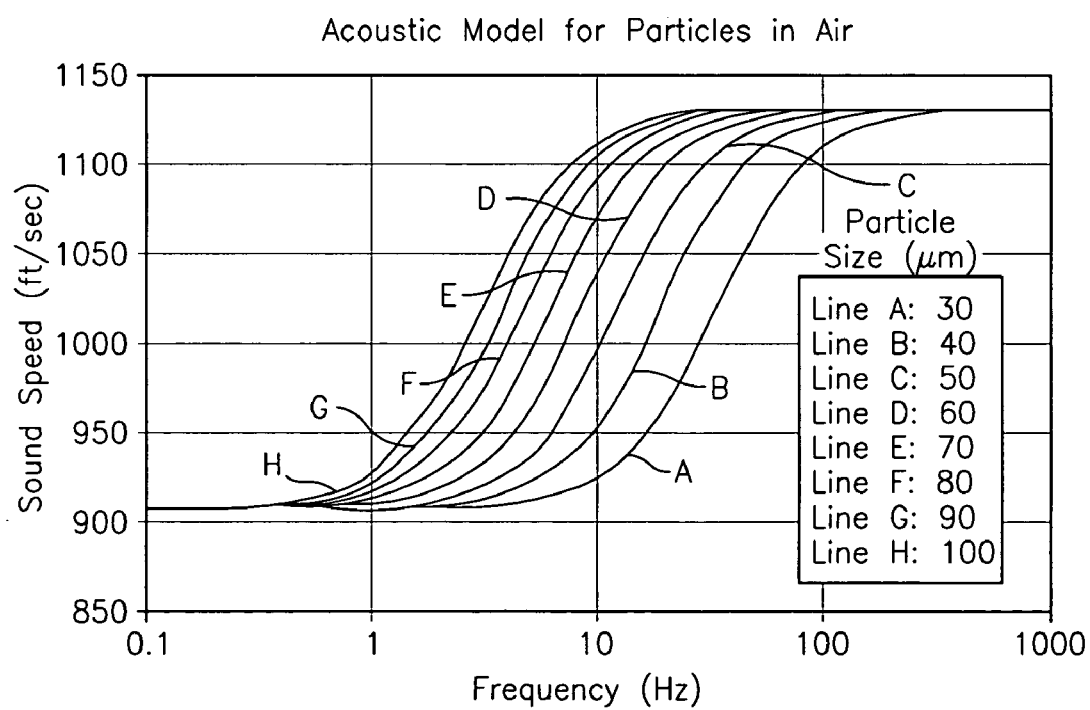
FIG. 13 is a plot of sound speed as a function of frequency for air/particle mixtures with varying particle size where the air-to-particle mass ratio is fixed.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 12 and FIG. 13 show the dispersive behavior in relations to the speed of sound for coal/air mixtures with parameters typical of those used in pulverized coal deliver systems.

In particular FIG. 12 shows the predicted behavior for nominally 50 micrometer size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 13 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

Figure 14:
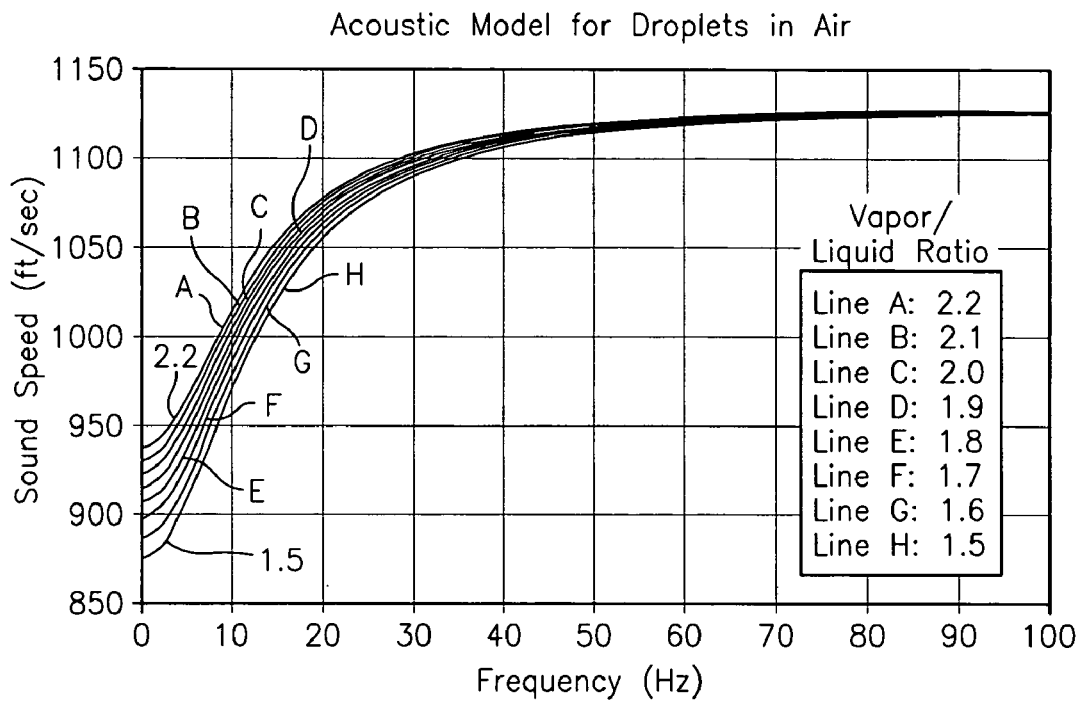
FIG. 14 is a plot of sound speed as a function of frequency for vapor/liquid mixtures with fixed droplet size and varying liquid-to-vapor ratio.
Figure 15:
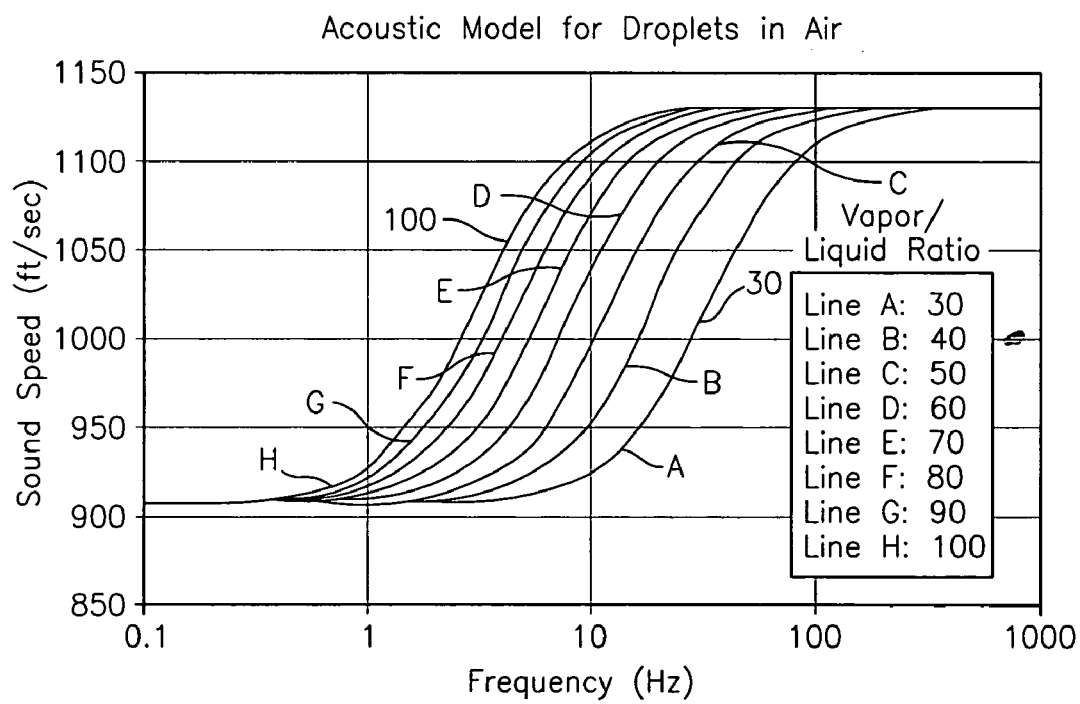
FIG. 15 is a plot of sound speed as a function of frequency for vapor/liquid mixtures with varying droplet size where the liquid-to-vapor ratio is fixed.

FIGS. 14 and 15 show the dispersive behavior for vapor/liquid mixtures with parameters typical of those used in steam flow systems. In particular FIG. 14 shows the predicted behavior for nominally 50 micrometer size liquid droplets in vapor for a range of liquid-to-vapor ratios. As shown, the effect of liquid-to-vapor ratio is well defined in the low frequency limit. However, the effect of the liquid-to-vapor ratio becomes indistinguishable at higher frequencies, approaching the sound speed of the pure air at high frequencies (above ~100 Hz).

Similarly, FIG. 15 shows the predicted behavior for a vapor/liquid mixture with a liquid-to-vapor ratio of 1.8 with varying liquid droplet size. This figure illustrates that liquid droplet size has no influence on either the low frequency limit (quasi-steady) sound speed, or on the high frequency limit of the sound speed. However, droplet size does have a pronounced effect in the transition region.

FIG. 12, FIG. 13, FIG. 14, and FIG. 15 illustrate an important aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are interrelated, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications and typical steam applications, this transitional region begins at fairly low frequencies, ~2 Hz for 50 micrometer size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements and that the dispersive characteristics of the vapor/liquid mixture should be utilized to determine droplet size and liquid-to-vapor ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 6 and FIG. 9 depict two different embodiments of the flow logic 36 to measure various parameters of the flow process, the present invention contemplates that the functions of these two embodiments may be performed by a single flow logic 36.

EXAMPLES

The above-described method for calculating the sound speed of a fluid inside a pipe using sub-array processing has been demonstrated. A test was conducted that required measuring the speed of sound and flow velocity of air flowing through a sensing device at high subsonic Mach. The sensing device was similar to that depicted in FIG. 2, but with ten dynamic pressure transducers mounted through the tube so that the sensing diaphragm was flush with the inside surface of the tube. The sensing device was inserted into a wind tunnel capable of high subsonic flow. As expected, when inserting the open-ended tube into a high flow rate environment strong acoustic resonances developed inside the tube. The resonance conditions are believed to be due to the reflection of the one-dimensional acoustic waves at each open end of the tube creating multiple coherent acoustic waves propagating in both directions. As discussed above multiple coherent signals introduce a degeneracy in the calculation of the spatial correlation matrix adversely affecting adaptive array processing algorithms, including MVDR and MUSIC.

Data from this wind tunnel test were processed both with and without the inclusion of sub-array processing. Standard processing without implementing sub-arrays resulted in a 10×10 spatial correlation matrix. Sub-array processing was implemented by averaging three sub-arrays of eight sensors each from the standard 10×10 matrix to form an 8×8 spatially averaged correlation matrix. Specifically, the three sub-arrays comprise a first sub-array comprising sensors 1–8, a second sub-array comprising sensors 2–9 and a third sub-array comprising sensors 3–10. In both cases the resulting correlation matrix was processed with the MVDR algorithm and then the speed of sound relative to the stationary sensing device was determined for both propagation directions by measuring the slope of the resulting acoustic "ridge" on the left and right sides of the k-w plane. The actual speed of sound propagation through the fluid was calculated by averaging the measured left-traveling and right-traveling acoustic speed. The flow velocity was calculated by differencing the measured left-traveling and right-traveling acoustic speed and dividing by two. The results are shown in Tables 1 and 2, where Table 1 indicates the results obtained with standard processing (without implementing sub-arrays) and Table 2 indicates the results obtained using processing with sub-arrays.

TABLE 1

Standard Processing

| Timestamp | Air SOS (ft/s) | Flow Velocity (ft/s) | Ma |
|---|---|---|---|
| Sep. 25, 2002 13:40 | 1136.6 | 735.2 | 0.65 |
| Sep. 25, 2002 13:42 | 1139.2 | 741.2 | 0.65 |
| Sep. 25, 2002 13:44 | 1120.9 | 722.6 | 0.64 |
| Sep. 25, 2002 13:46 | 1126.8 | 729.7 | 0.65 |
| Sep. 25, 2002 13:48 | 1109.7 | 714.0 | 0.64 |
| Sep. 25, 2002 13:49 | 1106.5 | 708.9 | 0.64 |
| Sep. 25, 2002 13:51 | 1107.0 | 711.7 | 0.64 |
| Sep. 25, 2002 13:53 | 1126.2 | 730.4 | 0.65 |
| Sep. 25, 2002 13:55 | 1135.0 | 738.1 | 0.65 |
| Sep. 25, 2002 13:57 | 1140.1 | 743.0 | 0.65 |

TABLE 1-continued

Standard Processing

| Timestamp | Air SOS (ft/s) | Flow Velocity (ft/s) | Ma |
|---|---|---|---|
| Average | 1124.8 | 727.5 | 0.65 |
| Std Dev | 13.3 | 12.5 | 0.004 |

TABLE 2

Sub-Array Processing

| Timestamp | Air SOS (ft/s) | Flow Velocity (ft/s) | Ma |
|---|---|---|---|
| Sep. 25, 2002 13:40 | 1090.5 | 691.7 | 0.63 |
| Sep. 25, 2002 13:42 | 1089.2 | 692.1 | 0.64 |
| Sep. 25, 2002 13:44 | 1087.8 | 690.5 | 0.63 |
| Sep. 25, 2002 13:46 | 1090.8 | 694.9 | 0.64 |
| Sep. 25, 2002 13:48 | 1091.5 | 696.4 | 0.64 |
| Sep. 25, 2002 13:49 | 1089.8 | 693.0 | 0.64 |
| Sep. 25, 2002 13:51 | 1090.5 | 695.6 | 0.64 |
| Sep. 25, 2002 13:53 | 1089.8 | 695.2 | 0.64 |
| Sep. 25, 2002 13:55 | 1090.0 | 694.3 | 0.64 |
| Sep. 25, 2002 13:57 | 1090.6 | 695.0 | 0.64 |
| Average | 1090.0 | 693.9 | 0.64 |
| Std Dev | 1.0 | 1.9 | 0.001 |

Note the significant improvement of the results when using sub-array processing. The repeatability, as measured by the standard deviation, is improved by an order of magnitude.

Table 3 summarizes the sound speed data for the entire test and compares the measured results using sub-array processing as described above with reference (known) measurements.

TABLE 3

| | Mach Set Point | | | | | |
|---|---|---|---|---|---|---|
| | 0.60 | 0.50 | 0.40 | 0.30 | 0.55 | 0.575 |
| Reference Sound Speed (m/s) | 333.7 | 337.1 | 340.3 | 342.9 | 340.3 | 340.3 |
| Measured Sound Speed, Avg (m/s) | 332.3 | 338.2 | 339.2 | 341.9 | 336.6 | 339.3 |
| Measured Sound Speed, Std Dev (m/s) | 0.31 | 0.10 | 0.08 | 0.09 | 0.18 | 0.17 |

Again note the consistency of the results indicated by low standard deviation and the close match with the reference measurements in all cases.

While the example of sub-array processing described herein is implemented by averaging three sub-arrays of eight sensors, it is contemplated that any desired number of sub-arrays of any number of sensors. For example, two sub-arrays of nine sensors using an overall 10 sensor array or four sub-arrays of seven sensors using an overall 10 sensor array. Other examples include three sub-arrays of four sensors for an overall 6 sensor array or two sub-arrays of five sensors for an overall 6 sensor array.

Note the use of sub-array processing is not limited to this specific test case or embodiment. Any time that multiple coherent signals are present within the sensing array the use of sub-array processing may be advantageous. For example, multiple coherent sources can be present within an industrial pipe if the naturally occurring acoustic waves are reflected after passing once through the array. This example would result in a two coherent acoustic waves, one propagating forward through the array the other, slightly delayed, propagating through the array in the opposite direction. The sub-array processing technique described hereinbefore may be used with any of the flow measuring devices referenced hereinbefore.

Aspects of the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a parameter of a fluid flowing through a pipe, the apparatus comprising:
   a spatial array of at least three sensors disposed at different axial locations along the pipe, each of the sensors providing a pressure signal indicative of unsteady pressure within the pipe at a corresponding axial location of the pipe, the spatial array including at least two overlapping sub-arrays, each sub-array including at least two of the sensors; and
   a signal processor configured to:
      determine a spatial correlation matrix for each of the sub-arrays using the pressure signals;
      average the spatial correlation matrices from the sub-arrays to provide an averaged spatial correlation matrix; and
      determine a parameter of the fluid using the averaged spatial correlation matrix.

2. The apparatus of claim 1, wherein the signal processor determines the parameter of the fluid using the averaged spatial correlation matrix as input to an adaptive array processing algorithm.

3. The apparatus of claim 1, wherein, in determining the parameter of the fluid, the signal processor is further configured to:

determine a slope of at least one ridge in a k-ω plane; and
determine the parameter of the fluid using the slope of the at least one ridge.

4. The apparatus of claim 1, wherein the pipe is open ended and is positioned within the fluid flow for forming a portion of a sensing device.

5. The apparatus of claim 1 wherein the at least three pressure sensors are selected from a group consisting of: piezoelectric, piezoresistive, strain gauge, PVDF, optical sensors, ported ac pressure sensors, accelerometers, velocity sensors, and displacement sensors.

6. The apparatus of claim 1, wherein the at least three pressure sensors are wrapped around at least a portion of the pipe and do not contact the fluid.

7. The apparatus of claim 1, wherein the parameter of the fluid includes at least one of: velocity, speed of sound, density, volumetric flow rate, mass flow rate, composition, entrained air, consistency, steam quality or wetness, vapor to mass ratio, liquid to solid ratio, enthalpy, and site of particles in the fluid.

8. A method of measuring a parameter of a fluid flowing through a pipe using a spatial array of at least three sensors disposed at different axial locations along the pipe, each of the sensors providing a pressure signal indicative of unsteady pressure within the pipe at a corresponding axial location of the pipe, the method comprising:
determining a spatial correlation matrix for each of the sub-arrays using the pressure signals;
averaging the spatial correlation matrices from the sub-arrays to provide an averaged spatial correlation matrix; and
determining a parameter of the fluid using the averaged spatial correlation matrix.

9. The method of claim 8, wherein determining the parameter of the fluid includes:
applying the averaged spatial correlation matrix as input to an adaptive array processing algorithm.

10. The method of claim 9, wherein determining the parameter of the fluid further includes:
determining a slope of at least one ridge in the k-ω plane; and
determining the parameter of the fluid using the slope of the at least one ridge.

11. The method of claim 8, wherein the at least three pressure sensors are selected from a group consisting of: piezoelectric, piezoresistive, strain gauge, PVDF, optical sensors, ported ac pressure sensors, accelerometers, velocity sensors, and displacement sensors.

12. The method of claim 8, wherein the at least three pressure sensors are wrapped around at least a portion of the pipe and do not contact the fluid.

13. The method of claim 8, wherein the parameter of the fluid includes at least one of: velocity, speed of sound, density, volumetric flow rate, mass flow rate, composition, entrained air, consistency, steam quality or wetness, vapor to mass ratio, liquid to solid ratio, enthalpy, and site of particles in the fluid.

14. The method of claim 8, wherein the pipe is open ended and is positioned within the fluid flow for forming a portion of a sensing device.

15. A computer storage medium encoded with machine-readable computer program code for measuring a parameter of a fluid passing through a pipe using a spatial array of at least three sensors disposed at different axial locations along the pipe, each of the sensors providing a pressure signal indicative of unsteady pressure within the pipe at a corresponding axial location of the pipe, the storage medium including instructions for causing a computer to implement a method when executed by a computer processor comprising:
determining a spatial correlation matrix for each of the sub-arrays using the pressure signals;
averaging the spatial correlation matrices from the sub-arrays to provide an averaged spatial correlation matrix; and
determining a parameter of the fluid using the averaged spatial correlation matrix.

16. The storage medium of claim 15, wherein determining the parameter of the fluid includes:
applying the averaged spatial correlation matrix as input to an adaptive array processing algorithm.

17. The apparatus of claim 1, the apparatus includes the spatial array of sensors include 4, 5, 6, 7, 8, 9, 10, 11, 12, 13, 14, 15, 16, 17, 18, 19, 20, 21, 22, 23, or 24 sensors.

18. The apparatus of claim 1, wherein each sub-array include the same number of sensors.

19. The method of claim 8, the apparatus includes the spatial array of sensors include 4, 5, 6, 7, 8, 9, 10, 11, 12, 13, 14, 15, 16, 17, 18, 19, 20, 21, 22, 23, or 24 sensors.

20. The method of claim 8, wherein each sub-array include the same number of sensors.

* * * * *